United States Patent
Hutchison et al.

(10) Patent No.: US 9,244,865 B2
(45) Date of Patent: Jan. 26, 2016

(54) OBTAINING DIAGNOSTIC INFORMATION THROUGH HOST INTERFACES

(71) Applicant: SanDisk Technologies, Inc., Plano, TX (US)

(72) Inventors: Neil David Hutchison, Campbell, CA (US); Sebastien Jean, Milpitas, CA (US); Nagdi Tafish, Milpitas, CA (US); Lee Gavens, Milpitas, CA (US); David Brief, Kfar Saba (IL)

(73) Assignee: SanDisk Technologies, Inc., Plano, TX (US)

( * ) Notice: Subject to any disclaimer, the term of this patent is extended or adjusted under 35 U.S.C. 154(b) by 0 days.

(21) Appl. No.: 14/289,398

(22) Filed: May 28, 2014

(65) Prior Publication Data

US 2015/0347325 A1    Dec. 3, 2015

(51) Int. Cl.
*G06F 13/00* (2006.01)
*G06F 13/10* (2006.01)

(52) U.S. Cl.
CPC ................................. *G06F 13/10* (2013.01)

(58) Field of Classification Search
CPC ............................................... G06F 13/00
See application file for complete search history.

(56) References Cited

U.S. PATENT DOCUMENTS

| | | | |
|---|---|---|---|
| 6,892,248 B2 | 5/2005 | Thayer | |
| 7,962,792 B2 | 6/2011 | Diggs et al. | |
| 8,008,710 B2 * | 8/2011 | Fukuzumi et al. | ............ 257/326 |
| 8,187,936 B2 | 5/2012 | Alsmeier et al. | |
| 8,312,207 B2 | 11/2012 | Merry, Jr. et al. | |
| 8,327,193 B2 * | 12/2012 | Enarson et al. | ................. 714/42 |

OTHER PUBLICATIONS

Application as Filed for U.S. Appl. No. 14/133,979, filed Dec. 19, 2013, 121 pages.
Application as Filed for U.S. Appl. No. 14/136,103, filed Dec. 20, 2013, 56 pages.
Gilbert, Douglas, "Smartmontools for SCSI devices," dated Nov. 11, 2006, available at http://smartmontools.sourceforge.net, pp. 1-18.
Jang et al., "Vertical Cell Array using TCAT(Terabit Cell Array Transistor) Technology for Ultra High Density NAND Flash Memory," *2009 Symposium on VLSI Technology Digest of Technical Papers*, pp. 192-193, 2009.
Arya, P., "A Survey of 3D Nand Flash Memory", *EECS Int'l Graduate Program, National Chiao Tung University*, 2012, pp. 1-11.

(Continued)

*Primary Examiner* — Henry Tsai
*Assistant Examiner* — Jing-Yih Shyu
(74) *Attorney, Agent, or Firm* — Brinks Gilson & Lione

(57) ABSTRACT

Systems, methods, and apparatuses are provided to obtain diagnostic information from a storage device. A read command may be transmitted to a storage device, where the read command conforms to a block level storage protocol and is directed to an unused logical unit of storage memory included in the storage device, to an invalid logical block address, and/or to a mode page. The unused logical unit may be a predetermined logical unit of the storage memory that is not allocated by a file system. Diagnostic data may be received from the storage device in response to the read command. The diagnostic data may be information related to operation of the storage device and/or a component of the storage device.

20 Claims, 5 Drawing Sheets

(56) References Cited

OTHER PUBLICATIONS

Nowak, E. et al., "Intrinsic Fluctuations in Vertical NAND Flash Memories", *2012 Symposium on VLSI Technology Digest of Technical Papers*, 2012, pp. 21-22.

"The sdparm utility," dated Jun. 9, 2013, pp. 1-24, available at http://sg.danny.cz/sg/sdperm.html.

"Joint Test Action Group," dated Feb. 10, 2014, pp. 1-15, available at http://en.wikipedia.org/wiki/Joint_Test_Action_Group.

* cited by examiner

OBTAINING DIAGNOSTIC INFORMATION THROUGH HOST INTERFACES

BACKGROUND

1. Technical Field

This application relates to storage devices and, in particular, to diagnostic information related to storage devices.

2. Related Art

Storage systems do not always operate properly. Determining what is happening inside the storage device may be helpful in identifying a source of a problem. For example, an integrated circuit inside the storage device may be removed from the storage device and analyzed by monitoring signals on hardware pins protruding from the integrated circuit. The signals may indicate what is happening inside the storage device and may help identify the source of the problem.

SUMMARY

A storage device may be provided that includes storage memory, a diagnostic data collector, and a diagnostic logical unit manager. The diagnostic data collector may collect diagnostic data related to the operation of the storage device. The diagnostic logical unit manager may transmit the diagnostic data to a host device in response to a read command directed to a logical unit of the storage memory that is unallocated, to an invalid logical block address, and/or to a mode page. The read command may conform to a block level storage protocol. The block level storage protocol may be a protocol in which storage devices are read from and written to in units of logical data blocks. The invalid logical block address may identify a logical block that is not assigned to any file. The mode page may store configuration information about the storage device.

A system to obtain diagnostic information may be provided that includes storage memory, a diagnostic data collector, and a diagnostic logical unit manager. The diagnostic data collector may collect diagnostic data related to the operation of the storage memory. The diagnostic logical unit manager may cause the diagnostic data to be transmitted to the host device in response to a read command directed to an unallocated logical unit of the storage memory, to an invalid logical block address, and/or to a mode page, wherein the read command conforms to a block level storage protocol, and the block level storage protocol is a protocol in which read commands identify locations of requested data with logical block addressing.

A method to obtain diagnostic information may also be provided. A read command may be transmitted from a host device to a storage device, wherein the read command conforms to a block level storage protocol and is directed to an unused logical unit of storage memory included in the storage device, to an invalid logical block address, and/or to a mode page. The unused logical unit may be a logical unit of the storage memory that is not allocated by a file system. Diagnostic data may be received from the storage device at the host device in response to the read command. The diagnostic data may be information related to operation of at least one of the storage device and a component of the storage device.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
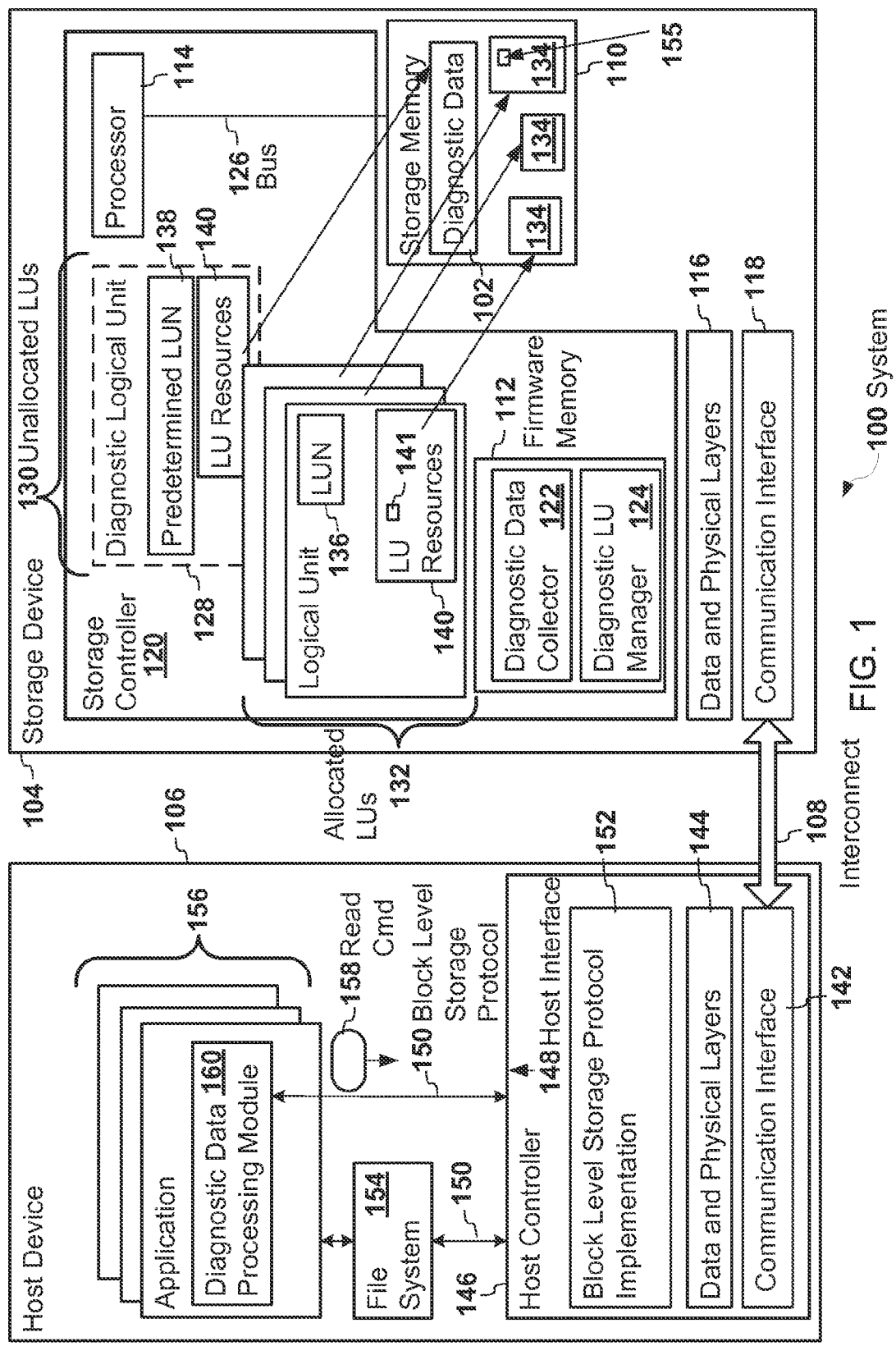
FIG. 1 illustrates an example of a system to obtain diagnostic data from a storage device.

In one example, a system to obtain diagnostic information from a storage device is provided. The system may include a host device and a storage device, where the storage device includes a communication interface, a diagnostic data collector, a diagnostic storage unit manager, and storage memory, such as flash memory. The storage device may be accessed by the host device using a standard block level storage protocol, such as UFS (Unified Flash Storage) or SCSI (Small Computer System Interface).

The communication interface may receive a read command from the host device. The read command may conform to the standard block level storage protocol. The read command may be directed to a logical unit of the storage memory that is unallocated by a file system in the host device. Logical units may be file system partitions. Each of the logical units may be assigned a number or identifier, such as a logical unit number (LUN). A logical unit may be identified by the file system when the file system allocates the logical unit to create a formatted partition. However, the logical unit that is referenced in the read command is a predetermined logical unit that is not allocated by the file system. The predetermined logical unit may be identified by, for example, a predetermined logical unit number.

Instead of storing data received from the host device in the predetermined logical unit, diagnostic data related to the storage device may be stored in the predetermined logical unit. For example, the diagnostic data collector that is included in the storage device may collect the diagnostic data and write the diagnostic data to the predetermined logical unit. The diagnostic data may include, for example, memory chip debugging information such as a bus trace, a NAND (Negated AND or NOT AND) bus trace, storage controller debugging information such as stack traces from firmware code, and/or any other diagnostic information related to the operation or state of the storage device or a component thereof.

The diagnostic logical unit manager may transmit the diagnostic data to the host device via the communication interface in response to the read command received from the host device. For example, the diagnostic logical unit manager may determine that the read command is for a block of data in the predetermined logical unit. In response, the diagnostic logical unit manager may read the diagnostic data stored in the predetermined logical unit. The diagnostic logical unit manager may transmit the diagnostic data to the host device via the communication interface.

In some examples, the diagnostic data may not be stored. Instead, the diagnostic logical unit manager may dynamically obtain the diagnostic data and transmit the diagnostic data to the host device in response to the read command.

In some examples when the diagnostic data is transmitted to the host device in response to the read command, the diagnostic data may be transmitted after a substantial amount of time has passed since the read command is received by the storage device. For example, the read command may be open ended, and the storage device may send the diagnostic data in response to the read command whenever the storage device subsequently has data. For example, the storage device may send the diagnostic data in response to the read command only after an intervening event occurs, such as after an event detected in the storage device.

One technical advantage of the systems, methods, and apparatuses described below may be that an application executing in the host device may obtain the diagnostic data by issuing a read command that conforms to a standard block level storage protocol. A standard driver for the block level storage protocol may be used without requiring a custom driver or custom hardware in the host device. The application may obtain the diagnostic data instead of host data by reading from the predetermined unallocated logical unit instead from an allocated logical unit. The diagnostic data may be cached in whole or in part in a buffer used by a standard driver. Another technical advantage of the systems, methods, and apparatuses described below may be that hardware pins dedicated to the purpose of extracting the diagnostic data from the host device or a subcomponent thereof are not required.

FIG. 1 illustrates an example of a system 100 to obtain diagnostic data 102 from a storage device 104. The system 100 may include the storage device 104 and a host device 106. The host device 106 and the storage device 104 may be in communication with each other over a wired, optical, or wireless interconnect 108.

The host device 106 may be any computing device. Examples of the host device 106 may include a cell phone, a smart phone, a tablet computer, a laptop computer, a desktop computer, a server computer, a dedicated device, an integrated circuit comprising a processor, or any other computer processing device.

The storage device 104 may be a device that stores data on behalf of the host device 106. The storage device 104 may be in any form, such as an integrated circuit, an electronic circuit, a Universal Serial Bus drive, a semiconductor memory device, a flash memory drive, a network drive, an optical drive, a magnetic hard drive, an expansion card, a memory card, an external memory card, and/or any other physical configuration.

The storage device 104 may include a storage memory 110, a firmware memory 112, a processor 114, a data and physical layer 116, and a communication interface 118. Alternatively or in addition, the storage device may include a storage controller 120. The storage controller 120 may include the firmware memory 112 and the processor 114.

The storage memory 110 and/or the firmware memory 112 may be any device for storing and/or retrieving data. The memory 110 and 112 may include non-volatile and/or volatile memory. Examples of the memory 110 and 112 may include a random access memory (RAM), a read-only memory (ROM), an erasable programmable read-only memory (EPROM), an electrically erasable programmable read-only memory (EEPROM) a semiconductor memory, and/or a flash memory. Alternatively or in addition, the memory 110 and 112 may include an optical drive, a magnetic drive (hard-drive), or any other form of data storage device.

The processor 114 may be one or more devices operable to execute logic. The logic may include computer executable instructions or computer code embodied in the firmware memory 112 or other memory that, when executed by the processor 114, cause the processor 114 to perform features of components that include the instructions or computer code. The processor 114 may be in communication with the storage memory 110 and the firmware memory 112. The processor 114 may also be in communication with additional components, such as the data and physical layer 116 and/or the communication interface 118. Examples of the processor 114 may include a microcontroller, a general processor, a central processing unit, an application specific integrated circuit (ASIC), a digital signal processor, a field programmable gate array (FPGA), a digital circuit, an analog circuit, and/or any other type of processor.

The firmware memory 112 may include a diagnostic data collector 122 and a diagnostic logical unit manager 124. The diagnostic data collector 122 may be a component that collects the diagnostic data 102 for retrieval. The diagnostic data collector 122 may store the collected diagnostic data 102 in memory, such as in the storage memory 110.

The diagnostic data 102 may be any information related to the operation and/or the state of the storage device 104 and/or of a component thereof. The diagnostic data 102 may include, for example, information describing an aspect of the operation of the storage device and/or the storage memory 110, information describing an aspect that is internal to an integrated circuit that includes the storage memory 110, an error log, trace information, memory chip debugging information, a bus trace, a NAND (Negated AND or NOT AND) bus trace, physical NAND defects, block error rates, error correction code (ECC) correction levels, bit error rates, bit error rate thresholds that are exceeded, firmware data structures, storage controller debugging information, a stack trace from firmware, a list of most recently executed programmatic procedures, information describing an external input to the storage device 104 and/or to a component thereof, commands received from the host device 106, a value of a pin on an integrated circuit included in the storage device 104, characteristics of power supplied to the storage device 104 and/or a component thereof, a current level and/or a voltage level of power supplied to the storage memory 110, and/or any other information related to the operation or state of the storage device or a component thereof. The NAND bus trace or other bus trace may identify states of lines of a bus 126 over which the processor 114 and the storage memory 110 communicate.

The diagnostic logical unit manager 124 may be a component that processes read commands directed to a diagnostic logical unit 128, which is an unallocated logical unit 130. The diagnostic logical unit manager 124 may be part of a component that processes read commands directed to allocated logical units 132. Alternatively, the diagnostic logical unit manager 124 may be separate from the component that processes read commands directed to the allocated logical units 132.

Each of the allocated logical units 132 may represent a corresponding file system partition 134 in the storage memory 110. Alternatively or in addition, each of the allocated logical units 132 may represent a file system volume. In some examples, each of the allocated logical units 132 may map logical data blocks to physical blocks of memory in the storage memory 110. Examples of logical units 132 may include NTFS partitions, FAT partitions, FAT32 partitions, ext2 partitions, and/or any other type of file system partition.

The storage device 104 may support a fixed number of logical units 130 and 132, for example. The allocated logical units 132 are "used logical units" because such logical units are in use by a file system 154. Conversely, the unallocated logical units 130 are unused logical units because such logical units are not currently used by the file system 154. The logical units 130 and 132 may include the allocated logical units 132 and the unallocated logical units 130. Examples of the logical units 130 and 132 may include logical units described in the Universal Flash Storage (UFS) standard, logical units described in the Small Computer System Interface (SCSI) standard, logical units described in the Internet Small Computer System Interface (iSCSI) standard, or any other file system partition or volume described in any other block level storage protocol standard.

Each of the logical units 130 and 132 may be identified by a logical unit number (LUN) 136. The LUN 136 may be a number or any other type of identifier. The LUN 136 for the diagnostic logical unit 128 may be a predetermined LUN 138. For example, if the storage device 104 supports logical units 130 and 132 having LUNs 136 in the range of zero to 11, then the predetermined LUN 138 may be one of the values in the supported range, such as eleven.

The predetermined LUN 138 may be predetermined using any type of mechanism. For example, the predetermined LUN 138 may be hardwired in the storage device 104, determined by one or more pins on an integrated circuit chip included in the storage device 104, and/or configured through communication to the storage device 104 from the host device 106. For example, the predetermined LUN 138 may be determined by the storage device 104 to be the LUN 136 of the first unallocated logical unit 130 that the host device 106 attempts to read from.

Each of the logical units 130 and 132 may identify logical unit resources 140 used by each respective one of the logical units 130 and 132. For example, the logical unit resources 140 of each of the allocated logical units 132 may include logical data blocks (also known as logical blocks) in the storage memory 110 that are contained in the corresponding file system partition 134 in the storage memory 110. The logical unit resources 140 of the diagnostic logical unit 128 may include logical data blocks in the storage memory 110, registers, and/or any other memory that contains the diagnostic data 102. In some examples, the logical unit resources 140 of each of the logical units 130 and 132 may include one or more mode pages 141 that store configuration information about the respective logical unit.

The communication interface 118 may be a physical component for communicating over the interconnect 108 with a corresponding communication interface 142 in the host device 106. Examples of the communication interface 118 and 142 may include a Universal Serial Bus (USB) interface, a FireWire interface, a wireless networking interface, a coupler, a circuit, or any other hardware suitable for the interconnect 108 in use.

The data and physical layers 116 may be communication layers for communicating with corresponding data and physical layers 144 in the host device 106. In particular, the data and physical layers 116 and 144 may be an implementation of a data layer and a physical network layer described in the Open Systems Interconnection (OSI) model (ISO/IEC 7498-1). The physical network layer may be a Media Access Control (MAC) layer, a 10BASE-T layer, an 802.11a/b/g/n PHY layer, or any other physical network layer. The data layer may be a PCIE® layer, a Fibre Channel layer, an 802.11a/b/g/n MAC/LLC layer, or any other data layer. PCIE is a registered trademark of PCI-SIG Corporation of Portland, Oreg.

The data and physical layers 144 and the communication interface 142 in the host device 106 may be included in a host controller 146 that exposes a host interface 148. The host interface 148 may support a block level storage protocol 150. Accordingly, the host controller 146 may include a block level storage protocol implementation 152 that implements the block level storage protocol 150 in the host device 106.

The block level storage protocol 150 may be a protocol in which storage devices are read from and written to in units of logical data blocks. In some examples, the logical data block may be the smallest unit of data that an operating system may write to the storage device 104 and/or the storage memory 110. The file system 154 of the operating system in the host device 106 may map files to logical data blocks. A logical block address of a logical data block assigned to a file by the file system 154 of the file system partition 134 may be referred to as valid logical block address. Conversely, a logical block address of a logical block of the file system partition 134 that is not assigned to a file may be referred to as an invalid logical block address 155.

Applications 156 may read from and write to files through the file system 154. In turn, the file system 154 may convert the file reads and/or file writes into corresponding reads and/or writes of logical data blocks that conform to the block level storage protocol 150.

Alternatively or in addition, the block level storage protocol 150 may be a protocol in which read commands may identify locations of requested data with logical block addressing. Logical block addressing (LBA) is a common scheme used for specifying the location of blocks of data stored on computer storage devices. LBA is a linear addressing scheme: blocks are located by an integer index, with the first block being LBA 0, the second LBA 1, and so on.

One example of the block level storage protocol 150 is the Universal Flash Storage (UFS) protocol. Additional examples of the block level storage protocol 150 include embedded Multi-Media Controller (eMMC), Non Volatile Memory Express (NVME), Small Computer System Interface (SCSI), Serial AT Attachment (SATA), Serial Attached SCSI (SAS), Internet Small Computer System Interface (iSCSI), SCSI over Fibre Channel, SCSI RDMA Protocol (SRP) over Remote Direct Memory Access (RDMA), and iSCSI over TCP/IP.

During operation of the system 100, the host device 106 may obtain the diagnostic data 102. In particular, the host device 106 may obtain the diagnostic data 102 by transmitting a read command 158 to the storage device 104. The read command 158 may conform to the block level storage protocol 150 and may be directed to the diagnostic logical unit 128.

For example, a diagnostic data processing module 160 in the host device 106 may pass the read command 158 to the host controller 146. The read command 158 may identify the diagnostic logical unit 128 as a target of the read command 158 by including the predetermined LUN 138. The diagnostic data processing module 160 may be included in one of the applications 156 in the host device 106.

The block level storage protocol implementation 152 may transmit the read command 158 to the storage controller 120 of the storage device 104. In doing so, the read command 158 may pass through the data and physical layers 144 and communication interface 142 of the host device 106, over the interconnect 108, and through the communication interface 118 and the data and physical layers 116 of the storage device 104.

The diagnostic logical unit manager 124 may receive the read command 158 directly or indirectly through the data and physical layers 116 of the storage device 104. The diagnostic logical unit manager 124 may determine that the read command 158 is directed to the diagnostic logical unit 128 instead of to any of the allocated logical units 132 because the read command 158 includes or otherwise identifies the predetermined LUN 138. Instead of returning an error indicating that the read command 158 is directed to one of the unallocated logical units 130, the diagnostic logical unit manager 124 may process the read command 158 as a request for the diagnostic data 102.

The diagnostic logical unit manager 124 may read the diagnostic data 102 from the associated logical unit resources 140. For example, the diagnostic logical unit manager 124 may read the diagnostic data 102 from the storage memory 110. Alternatively or in addition, the diagnostic logical unit manager 124 may receive the diagnostic data 102 directly from the diagnostic data collector 122. The diagnostic logical unit manager 124 may return the diagnostic data 102 to the host controller 146 in response to the read command 158.

In turn, the host controller 146 may return the diagnostic data 102 via the host interface 148 to the diagnostic data processing module 160 as a response to the read command 158. The diagnostic data processing module 160 may cause the diagnostic data to be displayed. Alternatively or in addition, the diagnostic data processing module 160 may analyze the diagnostic data 102 to identify and/or diagnose an issue. Alternatively or in addition, the diagnostic data processing module 160 may transmit the diagnostic data 102 to another component of the host device 106 or to another device for further processing and/or display. A person may view the displayed diagnostic data 102, for example, and identify an issue with the storage device 104 and/or identify a cause of an issue.

As described above, the read command 158 may indicate that data is to be read from the diagnostic logical unit 128. In some examples, the read command 158 may convey additional information to the storage device 104. In some examples, the read command 158 may identify one or more offsets or logical data blocks. The identified offset may indicate that only a subset of the diagnostic data 102 is requested by the diagnostic data processing module 160. Alternatively or in addition, the identified offset may operate as a security measure. For example, the storage device 104 may return the diagnostic data 102 in response to the read command 158 only if a predetermined offset is identified by the read command 158 in addition to the read command 158 identifying the diagnostic logical unit 128.

The diagnostic logical unit manager 124 may return the diagnostic data 102 to the host controller 146 in response to the read command 158 in multiple ways. In a single shot example, the read command 158 may be for a fixed or predetermined amount of data. In such an example, the diagnostic logical unit manager 124 may transfer the fixed or predetermined amount of the diagnostic data 102 to the host device 106 in response to the read command 158. The read command 158 may include, for example, the predetermined LUN 138, an offset or logical data block, and a length of data to be read. The length of data to be read may indicate the predetermined amount of the diagnostic data 102 to be read. In the single shot example, the read command 158 may complete when the fixed or predetermined amount of the diagnostic data 102 is transferred to the host device 106.

In an ongoing transfer or multi-shot example, the read command 158 may complete after multiple transfers of portions of the diagnostic data 102 are made from the storage device 104 to the host device 106. In one such example, a host component, such as the block level storage protocol implementation 152, may include a buffer just large enough to store all of the diagnostic data 102 received in response to the read command 158. Alternatively, or in addition, the buffer may be a circular buffer from which the host component may repeatedly read portions of the diagnostic data 102 as the data is received from the storage device 104.

In the single-shot examples and in some multi-shot examples, the host device 106 may control the amount of data returned in response to a read command. A host driven read command is a read command in which the host device 106 controls how much data is returned in response to the read command. For example, the current version of the UFS protocol states that, at the point of sending a read command, the host device 106 must have enough buffer space available to receive all of the data to be read. If the read command 158 is a host driven read command, then the read command 158 may complete when the amount of data requested by the host device 106 is transferred to the host device 106. The data requested by the host device 106 may sometimes be transferred in multiple chunks, and may be interleaved with host commands that are not directed to the diagnostic logical unit 128.

In contrast, open ended read commands are read commands in which the storage device 104 controls how much data is returned. The SCSI protocol and a draft version of the UFS protocol describe open ended read commands. If the read command 158 is an open ended read command, then the read command 158 may end when the host device 106 transmits an indication to the storage device 104 that enough data has been received. In some examples, if the read command 158 is an open ended read command, then the read command 158 may end when an indication that the read command is complete, such as an error code, is transferred to the host device 106 from the storage device 104.

If the read command 158 is an open ended read command, then diagnostic logical unit manager 124 may periodically transfer the diagnostic data 102 to the host device 106 in response to the read command 158. The periodic transfer of the diagnostic data 102 in response to the open ended read command effectively enables a streaming mode during which the diagnostic data 102 is streamed over time from the storage device 104 to the host device 106. As the diagnostic data 102 for the stream is collected by the diagnostic data collector 122, the diagnostic logical unit manager 124 may transmit the diagnostic data 102 in response to the open ended read command without waiting to receive another read command from the host device 106. The stream may be an intermittent stream in which bursts of the diagnostic data 102 are transmitted at irregular time intervals. Alternatively or in addition, the diagnostic data 102 may be transmitted at substantially regular time intervals.

Instead of transmitting an open ended read command, the diagnostic data processing module 160 may transmit a series of host driven read commands to enable the streaming mode. After the amount of the diagnostic data 102 requested in each of the host driven read commands is received by the diagnostic data processing module 160 in the host device 106, the diagnostic data processing module 160 may transmit the next respective host driven read command in the series.

The streaming mode may be used by a test application or in any other controlled environment where the stream of the diagnostic data 102 may be read by the diagnostic data processing module 160 substantially as fast as the diagnostic data 102 for the stream is collected by the diagnostic data collector 122. Alternatively or in addition, the streaming mode may be used in any environment where losing a portion of the diagnostic data 102 is acceptable when the diagnostic data processing module 160 fails to read the diagnostic data 102 fast enough. A timestamp, a sequence number, and/or any other timing indication may be included with portions of the diagnostic data in some examples. A person or component analyzing the diagnostic data may use the timing indication to understand any overlap and/or loss of data.

Some block level storage protocols may dictate that read commands directed to any one logical unit 130 or 132 be processed in a predetermined order. Some block level storage protocols may impose limitations on host buffer capacity for each logical unit 130 or 132. Because the diagnostic logical unit 128 is separate and independent from any of the allocated logical units 132, read commands directed to the diagnostic logical unit 128 may be executed in an order that is independent from an order in which read commands directed to the allocated logical units 132 are executed. In addition, limitations on host buffer capacity for each of the allocated logical units 132 may not affect limitations on host buffer capacity for the diagnostic logical unit 128. Accordingly, the storage device 104 may treat read commands directed to the diagnostic logical unit 128 independently from read commands directed to the allocated logical units 132.

In addition, reading the diagnostic data 102 from the diagnostic logical unit 128 facilitates obtaining the diagnostic data 102 in real-time and in parallel with other operations on any of the allocated logical units 132. In other words, execution of commands directed at any of the allocated logical units 132 may be unaffected by reading the diagnostic data 102 from the diagnostic logical unit 128. The diagnostic data 102 may be transmitted from the storage device 104, for example, at a lower priority than data read from any of the allocated logical units 132. Alternatively or in addition, host commands directed to any of the allocated logical units 132 may be processed by the storage device 104 at a higher priority than the read command 158 directed to the diagnostic logical unit 128.

The system 100 may be implemented with additional, different, or fewer components than illustrated in FIG. 1. For example, the system 100 may include just the storage device 104. Alternatively or in addition, the system 100 may include one or more components of the storage device 104, such as the diagnostic data collector 122 and/or the diagnostic logical unit manager 124.

Each component may include additional, different, or fewer components. For example, although the diagnostic data collector 122 illustrated in FIG. 1 is included in the firmware memory 112, all or a portion of the diagnostic data collector 122 may be included in another component. In one such example, a portion of the diagnostic data collector 122 may be a circuit included in the storage memory 110 that populates all or a portion of the diagnostic data 102 in the storage memory 110. The storage memory 110 may be included in an integrated circuit for example, and the circuit included in the storage memory 110 may store information about locations in physical memory that were recently accessed.

The storage memory 110 illustrated in FIG. 1 is included in the storage device 104. However, the storage memory 110 may be a separate discrete device such as a memory card. In some examples, the storage device 104 may be included in the host device 106. For example, the storage device 104 may be an internal drive of the host device 106.

In one example, the diagnostic data processing module 160 may be included in the file system 154 instead of one of the applications 156. In a second example, the diagnostic data processing module 160 may be included in the block level storage protocol implementation 152.

As described above, instead of returning an error indicating that the read command 158 is directed to one of the unallocated logical units 130, the diagnostic logical unit manager 124 may process the read command 158 as a request for the diagnostic data 102. Alternatively, if the block level storage protocol supports returning an indication of an error without necessarily terminating the read command 158, then the diagnostic logical unit manager 124 may return an error indicating that the read command 158 is directed to one of the unallocated logical units 130. In addition to the error, the diagnostic logical unit manager 124 may also return the diagnostic data 102. The diagnostic data processing module 160, which intentionally directed the read command 158 to the diagnostic logical unit 128, may ignore the error and receive the diagnostic data 102. However, if the file system 154 or one of the applications 156 erroneously directs a read command to one of the unallocated logical units 130 that happens to be the diagnostic logical unit 128, then the file system 154 or the application may receive the error and ignore and/or not receive the diagnostic data 102.

The read command 158 may be any command for reading host data from the storage device 104. The read command 158 may be a command that indicates the storage device 104 is to read one or more logical blocks identified by the command, such as a SCSI "read" command. Alternatively or in addition, the read command 158 may be a command that reads data from one or more buffers specified by the read buffer command, such as a SCSI "read buffer" command. Each of the buffers may be a portion of the logical unit 130 and 132 where host data may be stored in one or more logical blocks. Alternatively or in addition, the read command 158 may be any standard command for reading configuration information that complies with the block level storage protocol 150. For example, the read command 158 may be a command for reading the mode page 141. The mode page 141 may store metadata about the storage device 104, which may, in some examples, be changed by a user. A SCSI mode page may store metadata about a SCSI device. In SCSI parlance, the SCSI device may be any of the logical units 130 and 132 of which there may be several in a SCSI target.

As described above, the read command 158 may be directed to one of the unallocated logical units 130 to indicate to the storage device 104 that the read command 158 is to return the diagnostic data 102. Alternatively or in addition, the read command 158 may be directed to an invalid logical block of any of the allocated logical units 132 in order to indicate to the storage device 104 that the read command is to return the diagnostic data 102. For example, the read command 158 may be directed to one of the allocated logical units 132 and may identify a logical block address range that is outside a valid storage range for the logical unit.

In addition to obtaining the diagnostic data 102 from the storage device 104 through standard read commands, the host device 106 may transmit information related to collecting the diagnostic data 102 to the storage device 104 through standard write commands. For example, the diagnostic data processing module 160 may transmit a write command directed to the diagnostic logical unit 128, where the write command conforms to the block level storage protocol 150. In one example, the write command may identify what type of diagnostic information the diagnostic data collector 122 is to collect. In another example, the write command may identify what events are to trigger collection of the diagnostic data. For example, the write command may identify a breakpoint that, when reached by the processor 114, causes a stack trace to be collected and stored in the diagnostic data 102.

The diagnostic logical unit manager 124 may determine that the write command is directed to the diagnostic logical unit 128. For example, the diagnostic logical unit manager 124 may determine that the write command is directed to the diagnostic local unit 128 when the write command identifies the predetermined LUN 138 as a target of the write command.

The ability to obtain the diagnostic data 102 with the read command 158 may be a feature that is always enabled or may be enabled through a handshake mechanism. In one example of the handshake mechanism, the feature may be enabled by transmitting configuration information to the storage device 104 from the host device 106 indicating that the feature is to be enabled. The configuration information may be transmitted with a command for setting the mode page 141 or with any other command.

In a second example of the handshake mechanism, the feature may be enabled by performing a predetermined set of operations. The predetermined set of operations may provide a secure mechanism for enabling the ability to obtain the diagnostic data 102. In other words, the storage device 104 may not provide the diagnostic data 102 in response to the read command 158 unless the predetermined set of operations is performed first. The predetermined set of operations may be a shared secret. Performing the set of operations may transmit the shared secret to the storage device 104. The secure mechanism may therefore prevent a user of the storage device 104 from obtaining the diagnostic data 102 unless the user knows to perform the predetermined set of operations. The predetermined set of operations may include, for example, a write command directed to a predetermined LUN and/or predetermined logical address. In another example, the predetermined set of operations may include a write command having a predetermined payload directed to a predetermined LUN and/or predetermined logical address. In yet another example, the predetermined set of operations may include reading from a predetermined sequence of logical block addresses. In still another example, a password, such as a predetermined number, a predetermined sequence, and/or a certificate may be provided to the storage device 104 and/or the storage memory 110 with a command used to send data to the logical unit 130 or 132 and/or to the storage device 104. For example, the predetermined set of operations may include a SCSI "security protocol out" command, a write command, a command for setting the mode page 141, or any other type of command that transfers the password to the storage device 104. Alternatively or in addition, the password transferred to the storage device 104 may be encrypted so that the predetermined payload may not be detected by monitoring traffic on the interconnect 108.

Figure 2:
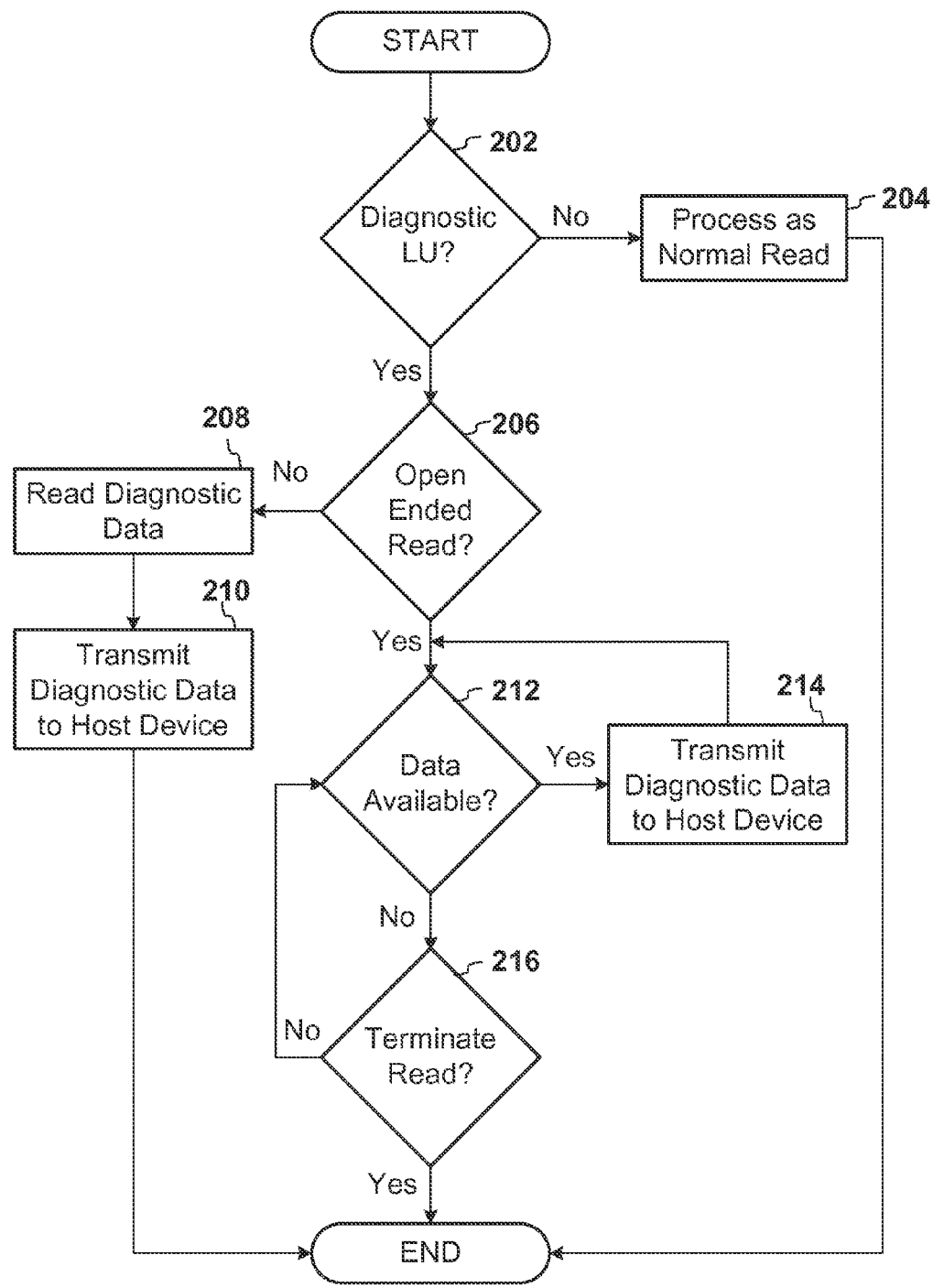
FIG. 2 illustrates a flow diagram of an example of the logic of a diagnostic logical unit manager.

FIG. 2 illustrates a flow diagram of one example of the logic of the diagnostic logical unit manager 124. In the example illustrated in FIG. 2, the diagnostic logical unit manager 124 supports both open ended read commands and host driven read commands.

Operations may begin when a determination (202) is made whether the read command 158 received by the storage device 104 is directed to the diagnostic logical unit 128. If the read command 158 is not directed to the diagnostic logical unit 128, then the read command 158 may be processed (204) as a "typical" read command. For example, if the read command 158 is directed to one of the allocated logical units 132, then the storage device 104 may read the requested data from the corresponding file system partition 134, and transfer the data to the host device 106.

Alternatively, if the read command 158 is directed to the diagnostic logical unit 128, then a determination (206) may be made whether the read command 158 is an open ended read command. If the read command 158 is a device driven read command instead of an open ended read command, then the diagnostic data 102 may be read (208) and transmitted (210) to the host device 106. In some examples, the diagnostic data 102 may be read (208) and transmitted (210) multiple times in order to complete the device driven read command. Operations may, for example, end after the device driven read command is complete.

In contrast, if the read command 158 is an open ended read command, then a determination (212) may be made whether the diagnostic data 102 is available. For example, the diagnostic data collector 122 may have notified the diagnostic logical unit manager 124 that the diagnostic data 102 is available in the storage memory 110 or other memory. Alternatively or in addition, the diagnostic data collector 122 may populate a circular buffer (not shown), and the diagnostic logical unit manager 124 may read from the circular buffer. The diagnostic data 102 may be determined to be available if the circular buffer is contains data, and determined to be unavailable when the circular buffer is empty.

If the diagnostic data 102 is available, then the diagnostic data 102 may be transmitted (214) to the host device 106. Because additional diagnostic data may still be available or be available at a later time, operations may return to where the determination (212) is made whether the diagnostic data 102 is available.

If the diagnostic data 102 is not available, then a determination (216) may be made whether to terminate the read command 158. In a first such example, an event may have occurred in the storage device 104 that indicates that the diagnostic data 102 requested will no longer be available. For example, the event may include detection of execution of an illegal instruction by the processor 114 when the requested diagnostic data 102 is for a stack trace when the illegal instruction is executed. In a second example of a determination that the read command 158 is to be terminated, the diagnostic logical unit manager 124 may have received an indication from the host device 106 that the read command 158 is to terminate.

If the determination is that the read command 158 is to terminate, then operations may end. Alternatively, if the determination is that the read command 158 is not to terminate, then operations may return to where the determination (212) is made whether the diagnostic data 102 is available.

The operations may end, for example, by waiting until a next read command is subsequently received from the host device 106. When the next read command is received, operations may return to where the determination (202) is made whether the read command 158 received by the storage device 104 is directed to the diagnostic logical unit 128.

The logic may include additional, different, or fewer operations than illustrated in FIG. 2. For example, the logic may not include the determination (206) of whether the read command 158 is an open ended read command, the determination (212) of whether the diagnostic data 102 is available, the transmission (214) of the diagnostic data 102 when the diagnostic data is available, and the determination (216) of whether the read command 158 is to terminate.

The operations may be executed in a different order than illustrated in FIG. 2. For example, if the diagnostic data 102 is transmitted (214) in response to the determination (212) that the diagnostic data 102 is available, operations may proceed to the determination (216) whether the read command 158 is to terminate instead of to the determination (212) that the diagnostic data 102 is available.

Figure 3:
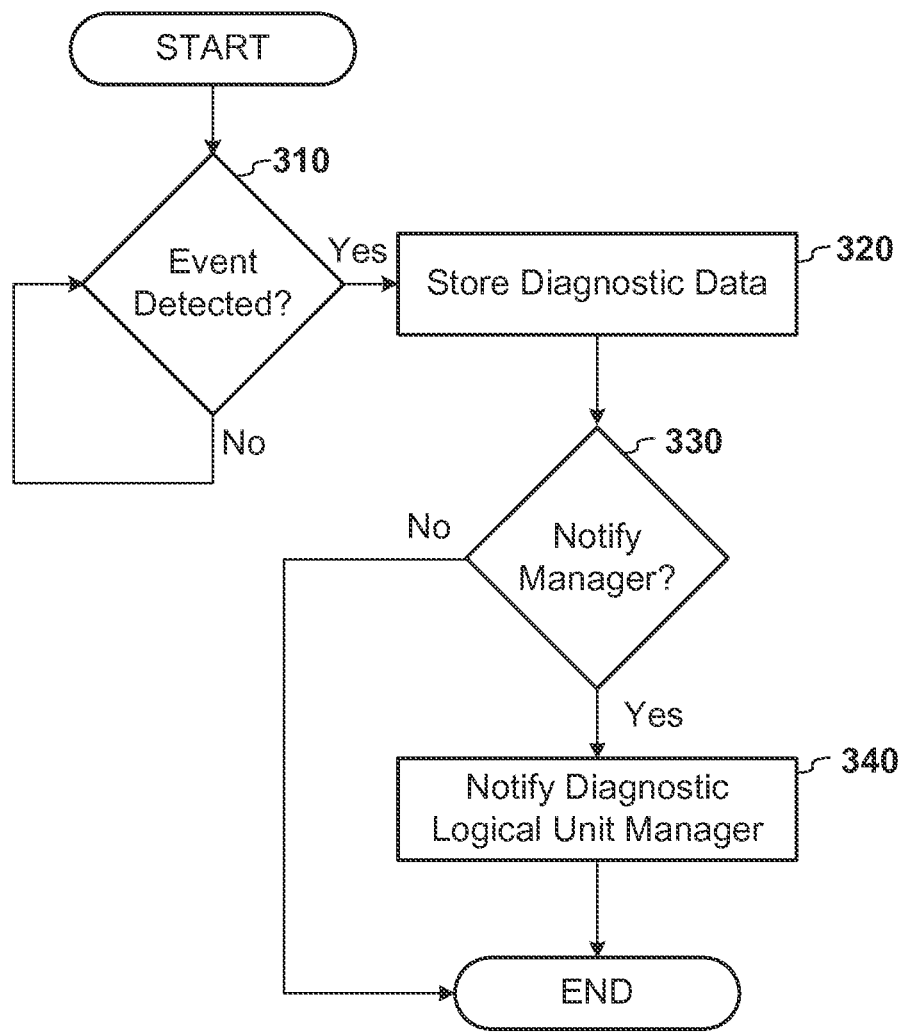
FIG. 3 illustrates a flow diagram of an example of the logic of a diagnostic data collector.

FIG. 3 illustrates a flow diagram of one example of the logic of the diagnostic data collector 122. Operations may begin with monitoring events within the storage device 104 and determining whether a monitored event is detected (310). For example, the diagnostic data collector 122 may monitor the processor 114 for execution of an illegal instruction. Alternatively or in addition, the diagnostic data collector 122 may monitor the processor 114 for execution of an instruction at a breakpoint. In still another example, the diagnostic data collector 122 may monitor the storage memory 110 for an access by the processor 114. In some examples, the diagnostic data collector 122 may monitor commands received from the host device 106.

If no monitored event is detected, then operations may return to determining whether a monitored event is detected (310). Alternatively, if a monitored event is detected, then corresponding diagnostic data may be stored (320) in the storage memory 110 or other memory. For example, if the processor 114 executes an illegal instruction or an instruction at a breakpoint, a stack trace may be stored (320) in the storage memory 110. In another example, if the processor 114 accesses the storage memory 110, then a bus trace may be stored (320) in the storage memory 110.

Alternatively or in addition, if a monitored event is detected, then a determination (330) may be made whether to notify the diagnostic logical unit manager 124. For example, the diagnostic data collector 122 may determine that the diagnostic logical unit manager 124 is to be notified that the diagnostic data 102 is available for the diagnostic logical unit manager 124 when the diagnostic logical unit manager 124 is in the streaming mode. Alternatively or in addition, the determination (330) of whether to notify the diagnostic logical unit manager 124 may be based any other criteria, such as whether a circular buffer (not shown) in the storage memory 110 is full of the diagnostic data 102.

If the diagnostic logical unit manager 124 is not to be notified, then operations may end. Alternatively, if the diagnostic logical unit manager 124 is to be notified, then the diagnostic logical unit manager 124 may be notified (340) of the availability of the diagnostic data 102. After the diagnostic logical unit manager 124 is notified (340), then operations may end. The operations may end by, for example, returning to monitoring events within the storage device 104 and determining whether a monitored event is detected (310). Alternatively or in addition, the operations may end by notifying the host device 106 that the diagnostic data 102 is available. The storage device 104 may notify the host device 106 that the diagnostic data 102 is available using any type of communication mechanism. For example, a dedicated pin, a dedicated physical line, and/or an electrical signal may be used to send the notification that the diagnostic data 102 is available to the host device 106. The dedicated pin or the dedicated physical line may be a pin or a line, respectively, that is dedicated to transmission of notifications that the diagnostic data 102 is available. The notification may be a message posted and/or originated by the storage device 104, such as a message transmitted PCI Express (Peripheral Component Interconnect Express). Alternatively or in addition, the notification may be a status bit in a command status. The notification may be a simple "data ready" indication. Alternatively, the notification may include additional information such as a priority, a logical block address, LUN, and/or a length of the diagnostic data 102. The notification may be transmitted by the storage device 104 in response to a command sent from the host device 106. Alternatively or in addition, the notification may be transmitted independently of any command transmitted from the host device 106.

The logic may include additional, different, or fewer operations than illustrated in FIG. 3. For example, the logic may not include the determination (330) of whether to notify the diagnostic logical unit manager 124. Alternatively or in addition, operations may be executed in a different order than illustrated in FIG. 3.

Figure 4:
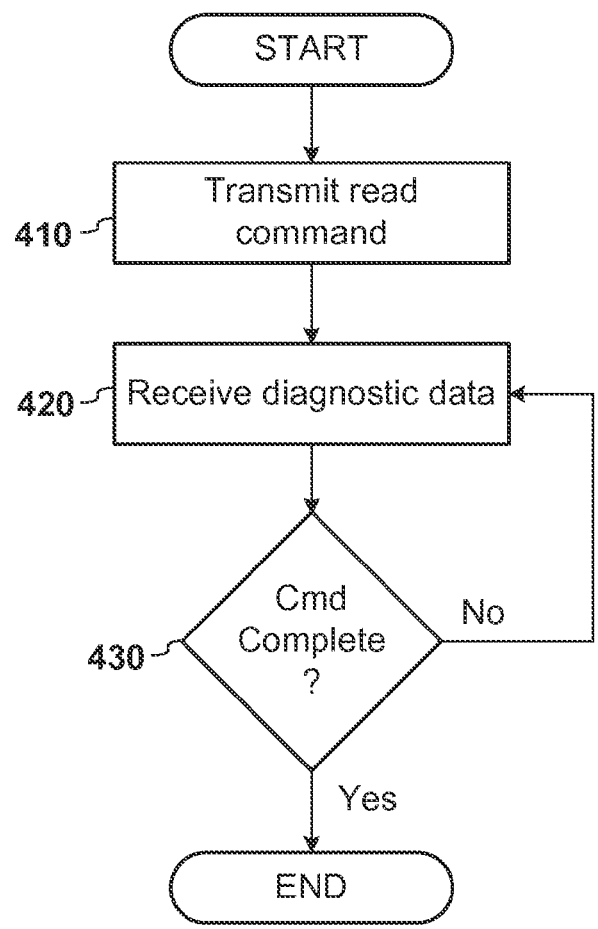
FIG. 4 illustrates a flow diagram of an example of the logic of a diagnostic data processing module.

FIG. 4 illustrates a flow diagram of an example of the logic of the diagnostic data processing module 160. The logic may include additional, different, or fewer operations. The operations may be executed in a different order than illustrated in FIG. 4.

The read command 158 may be transmitted (410) from the host device 106 to the storage device 104. The read command 158 may conform to the block level storage protocol 150 and be directed to a predetermined one of the unallocated logical units 130 of the storage memory 110.

The diagnostic data 102 may be received (420) at the host device 106 from the storage device 104 in response to the read command 158. A determination (430) may be made whether the read command 158 is complete. If the read command 158 is not yet complete, then operations may return to where the diagnostic data is received (420). Alternatively, if the read command 158 is complete, operations may end. Operations may end, for example, by causing the diagnostic data 102 to be displayed.

The system 100 may be implemented in many different ways. Each module, such as the diagnostic data collector 122, the diagnostic logical unit manager 124, the data and physical layers 116 and 144, the block level storage protocol implementation 152, and the diagnostic data processing module 160, may be hardware or a combination of hardware and software. For example, each module may include a circuit, an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each module may include memory hardware, such as a portion of the firmware memory 112, for example, that comprises instructions executable with the processor 114 or other processor to implement one or more of the features of the module. When any of the modules includes the portion of the memory that comprises instructions executable with the processor, the module may or may not include the processor. In some examples, each module may just be the portion of the firmware memory 112 or other physical memory that comprises instructions executable with the processor 114 or other processor to implement the features of the corresponding module without the module including any other hardware. Because each module includes at least some hardware even when the included hardware comprises software, each module may be interchangeably referred to as a circuit, such as the diagnostic data collector circuit 122, the diagnostic logical unit manager circuit 124, the data and physical layers circuit 116 and 144, the block level storage protocol implementation circuit 152, and the diagnostic data processing module circuit 160.

Some features are shown stored in a computer readable storage medium (for example, as logic implemented as computer executable instructions or as data structures in memory). Portions of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as modules, programs, or circuitry, may be combined or split among multiple modules, programs, or circuitry, distributed across several memories and processors, and may be implemented in a library, such as a shared library (for example, a dynamic link library ("DLL")).

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Furthermore, each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or such that each element is individually accessible. By way of non-limiting example, NAND devices contain memory elements (e.g., devices containing a charge storage region) connected in series. For example, a NAND memory array may be configured so that the array is composed of multiple strings of memory in which each string is composed of multiple memory elements sharing a single bit line and accessed as a group. In contrast, memory elements may be configured so that each element is individually accessible, e.g., a NOR memory array. One of skill in the art will recognize that the NAND and NOR memory configurations are exemplary, and memory elements may be otherwise configured.

The semiconductor memory elements of a single device, such as elements located within and/or over the same substrate or in a single die, may be distributed in two or three dimensions, such as a two dimensional array structure or a three dimensional array structure.

In a two dimensional memory structure, the semiconductor memory elements are arranged in a single plane or single memory device level. Typically, in a two dimensional memory structure, memory elements are located in a plane (e.g., in an x-z direction plane) which extends substantially parallel to a major surface of a substrate that supports the memory elements. The substrate may be a wafer over which the layers of the memory elements are deposited and/or in which memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arranged in non-regular or non-orthogonal configurations as understood by one of skill in the art. The memory elements may each have two or more electrodes or contact lines, such as bit lines and word lines.

A three dimensional memory array is organized so that memory elements occupy multiple planes or multiple device levels, forming a structure in three dimensions (i.e., in the x, y and z directions, where the y direction is substantially perpendicular and the x and z directions are substantially parallel to the major surface of the substrate).

As a non-limiting example, each plane in a three dimensional memory array structure may be physically located in two dimensions (one memory level) with multiple two dimensional memory levels to form a three dimensional memory array structure. As another non-limiting example, a three dimensional memory array may be physically structured as multiple vertical columns (e.g., columns extending substantially perpendicular to the major surface of the substrate in the y direction) having multiple elements in each column and therefore having elements spanning several vertically stacked memory planes. The columns may be arranged in a two dimensional configuration, e.g., in an x-z plane, thereby resulting in a three dimensional arrangement of memory elements. One of skill in the art will understand that other configurations of memory elements in three dimensions will also constitute a three dimensional memory array.

Figure 5:
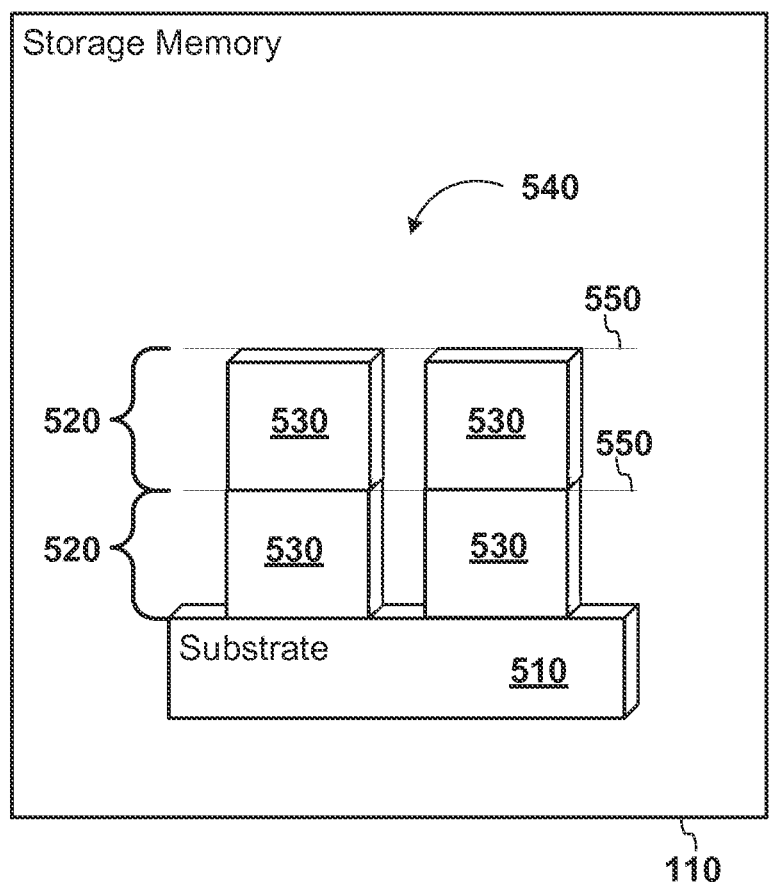
FIG. 5 illustrates an example of a monolithic three dimensional memory array.

FIG. 5 illustrates an example of a monolithic three dimensional memory array. By way of non-limiting example as illustrated in FIG. 5, in a three dimensional NAND memory array, the memory elements 530 may be connected together to form a NAND string within a single horizontal (e.g., x-z) plane. Alternatively, the memory elements 530 may be connected together to extend through multiple horizontal planes. Other three dimensional configurations can be envisioned wherein some NAND strings contain memory elements 530 in a single memory level while other strings contain memory elements 530 which extend through multiple memory levels. Three dimensional memory arrays may also be designed in a NOR configuration and in a ReRAM configuration.

A monolithic three dimensional memory array 540 is one in which multiple memory levels 550 are formed above and/or within a single substrate 510, such as a semiconductor wafer. In a monolithic three dimensional memory array 540, the layers 520 of each level of the array are formed on the layers 520 of each underlying level of the array. One of skill in the art will understand that layers 520 of adjacent levels of a monolithic three dimensional memory array 540 may be shared or have intervening layers between memory levels. In contrast, two dimensional arrays may be formed separately and then packaged together to form a non-monolithic memory device. For example, non-monolithic stacked memories have been constructed by forming memory levels on separate substrates and adhering the memory levels atop each other. The substrates may be thinned or removed from the memory levels before bonding, but as the memory levels are initially formed over separate substrates, such memories are not monolithic three dimensional memory arrays. Further, multiple two dimensional memory arrays or three dimensional memory arrays (monolithic or non-monolithic) may be formed separately and then packaged together to form a stacked-chip memory device.

Associated circuitry is typically required for proper operation of the memory elements and for proper communication with the memory elements. This associated circuitry may be on the same substrate as the memory array and/or on a separate substrate. As non-limiting examples, the memory devices may have driver circuitry and control circuitry used in the programming and reading of the memory elements.

One of skill in the art will recognize that this invention is not limited to the two dimensional and three dimensional exemplary structures described but cover all relevant memory structures within the spirit and scope of the invention as described herein and as understood by one of skill in the art.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A storage device comprising:
   a storage memory;
   a diagnostic data collector configured to collect diagnostic data related to operation of the storage device, wherein the diagnostic data collector is configured to store the diagnostic data in the storage memory; and
   a diagnostic logical unit manager configured to read the diagnostic data from the storage memory, wherein the diagnostic logical unit manager is further configured to transmit the diagnostic data to a host device in response to a read command, wherein the read command is directed to a logical unit of the storage memory that is unallocated, to an invalid logical block address, and/or to a mode page, wherein the read command conforms to a block level storage protocol, and the block level storage protocol is a protocol in which storage devices are read from and written to in units of logical data blocks.

2. The storage device of claim 1, wherein the unallocated logical unit is a diagnostic logical unit identified by a predetermined logical unit number (LUN).

3. The storage device of claim 1, wherein the diagnostic data is transmitted in a stream over time in response to the read command and the read command is an open ended read command.

4. The storage device of claim 1, wherein the diagnostic data is transmitted in a stream over time in response to the read command, and the read command comprises a plurality of host driven read commands.

5. The storage device of claim 1, wherein the diagnostic data is transmitted periodically when the diagnostic logical unit manager determines that the diagnostic data is available.

6. The storage device of claim 1, wherein the storage memory includes a three dimensional memory structure.

7. A system to obtain diagnostic information, the system comprising:
   a storage memory;
   a diagnostic data collector configured to collect diagnostic data related to operation of the storage memory, the diagnostic data collector further configured to collect the diagnostic data in the storage memory; and
   a diagnostic logical unit manager configured to read the diagnostic data from memory, the diagnostic logical unit manger further configured to cause the diagnostic data to be transmitted to a host device in response to a read command, wherein the read command is directed to an unallocated logical unit of the storage memory, to an invalid logical block address, and/or to a mode page, wherein the read command conforms to a block level storage protocol, and the block level storage protocol is a protocol in which read commands identify locations of requested data with logical block addressing.

8. The system of claim 7, wherein the diagnostic data comprises memory chip debugging information.

9. The system of claim 7 further comprising a processor and a bus, wherein the processor communicates with the storage memory over the bus, and wherein the diagnostic data comprises a bus trace that identifies states of lines on the bus.

10. The system of claim 9, wherein the bus trace comprises a NAND (Negated AND or NOT AND) bus trace.

11. The system of claim 7, wherein the diagnostic data comprises storage controller debugging information.

12. The system of claim 7, wherein the diagnostic data comprises a stack trace.

13. The system of claim 7 wherein the diagnostic data comprises information describing an aspect that is internal to an integrated circuit, and the integrated circuit includes the storage memory.

14. A method to obtain diagnostic information, the method comprising:
   transmitting a read command from a host device to a storage device, wherein the read command conforms to a block level storage protocol, and wherein the read command is directed to an unused logical unit of storage memory included in the storage device, to an invalid logical block address, and/or to a mode page, wherein the unused logical unit is a logical unit of the storage memory that is not allocated by a file system, wherein the invalid logical block address identifies a logical block that is not assigned to any file by the file system, and the mode page stores configuration information about the storage device; and
   receiving diagnostic data at the host device from the storage device in response to the read command, wherein the diagnostic data is information related to operation of at least one of the storage devices and a component of the storage device.

15. The method of claim 14, wherein receiving the diagnostic data comprises receiving the diagnostic data in a stream over time.

16. The method of claim 15, further comprising receiving a notification over a line and/or a pin dedicated to transmission of notifications that the diagnostic data is available.

17. The method of claim 15 further comprising repeatedly transmitting read commands from the host device to the storage device, wherein the read commands conform to the block level storage protocol and are directed to the unused logical unit.

18. The method of claim 14 further comprising enabling receipt of the diagnostic data by transmitting a shared secret to the storage device.

19. The method of claim 18 further comprising receiving the diagnostic data in a stream of data over time at the host device in response to the read commands directed to the unused logical unit.

20. A system to obtain diagnostic information, the system comprising:
   a storage memory;
   a diagnostic data collector configured to collect diagnostic data related to operation of the storage memory, and to store the diagnostic data in the storage memory; and
   a diagnostic logical unit manager configured to read the diagnostic data from the storage memory, the diagnostic logical unit manager further configured to cause the diagnostic data to be transmitted to a host device in response to a read command, wherein the read command is directed to an unallocated logical unit of the storage memory, to an invalid logical block address, and/or to a mode page, wherein the read command conforms to a block level storage protocol, and the block level storage protocol is a protocol in which read commands identify locations of requested data with logical block addressing, and wherein the storage memory comprises a silicon substrate and a plurality of memory cells forming at least two memory layers vertically disposed with respect to each other to form a monolithic three-dimensional structure, wherein at least one memory layer is vertically disposed with respect to the silicon substrate.

* * * * *